J. A. & H. A. PITTS.
Machine for Thrashing and Separating Grain.
No. 542.
2 Sheets—Sheet 1.
Patented Dec. 29, 1837.
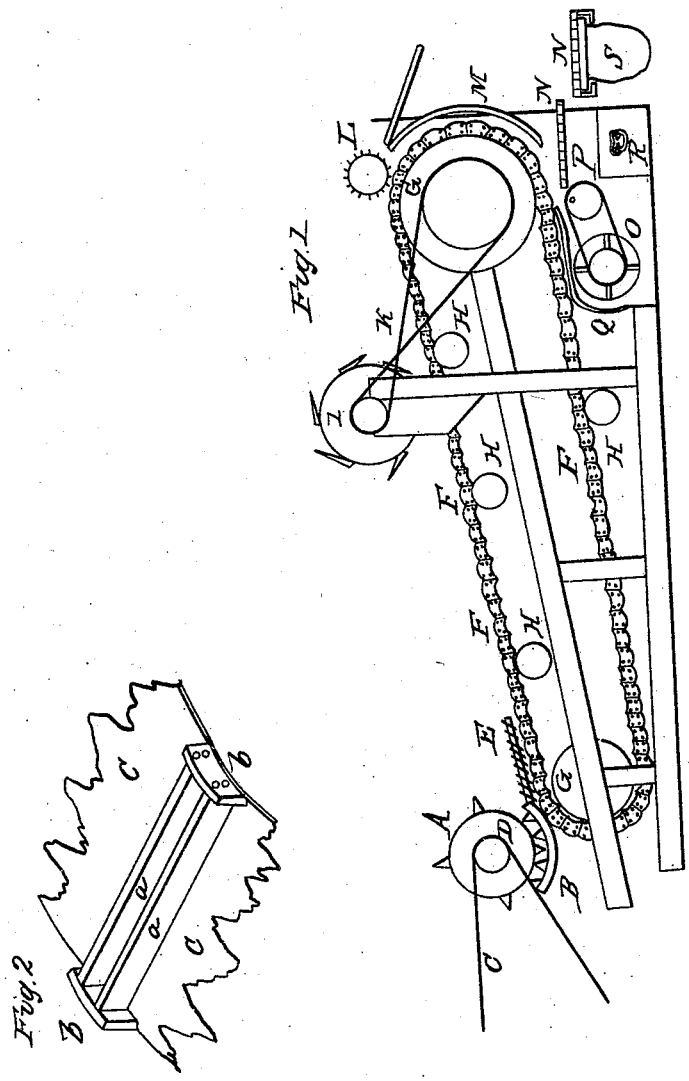
WITNESSES
INVENTORS

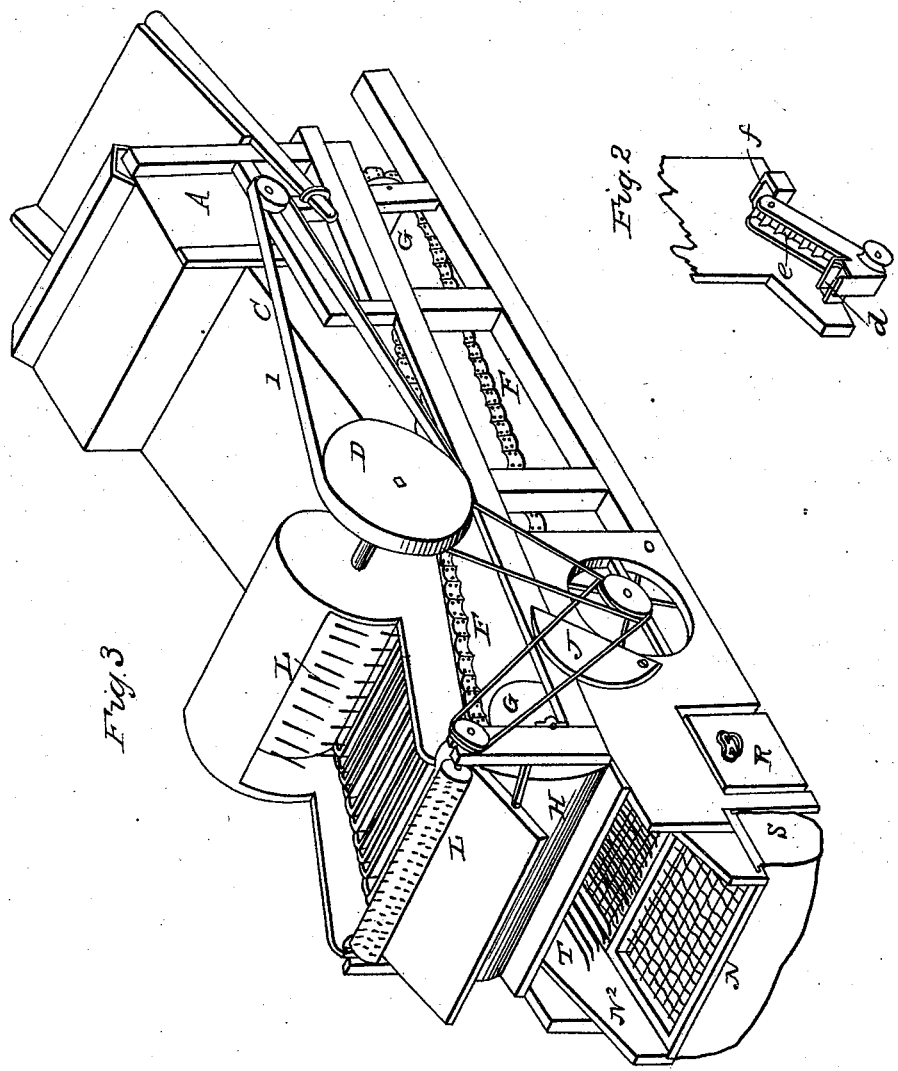

UNITED STATES PATENT OFFICE.

JOHN A. PITTS AND HIRAM A. PITTS, OF WINTHROP, MAINE.

MACHINE FOR THRESHING AND CLEANING GRAIN.

Specification of Letters Patent No. 542, dated December 29, 1837; Antedated June 29, 1837.

*To all whom it may concern:*

Be it known that we, JOHN A. PITTS and HIRAM A. PITTS, of Winthrop, in the county of Kennebec and State of Maine, have invented a new and Improved Combination of Machinery for Separating Grain from the Straw and Chaff as It Proceeds from the Threshing-Machine; and we do hereby declare that the following is a full and exact description thereof.

In the accompanying drawing Figure 1, is a section of the machine from end to end, Fig. 3, a perspective view thereof, and Figs. 2, and 4, detached parts to be presently described.

In the Figs. 1 and 3 where the same parts are represented they are designated by the same letters.

A, is the plan of the machine for threshing, of which B is the bed, or concave, which may be of the ordinary constructions, and fed in the usual way, C being the driving band passing around the pulley D. As the straw and grain leave the threshing machine with much force we place guard slats against which it strikes before it touches the endless apron; these are seen in section at E. We make them of sheet iron, extending across the machine in the position represented.

The endless apron which is to conduct off the grain and the straw, is peculiar in its construction, it is shown at F, F, but the manner of making it is represented in Fig. 2, *a, a,* are slats of wood, united by end pieces *b, b,* which are glued, or otherwise fastened on to cloth, or to leather, forming an endless apron, passing around the drums G, G, Fig. 1, they are so fastened that the end pieces *b, b,* are in contact, and thus form a series of troughs which receive and carry the grain forward until it falls upon the winnower. The endless apron is supported by the rollers H, H, Fig. 1. To prevent the obstructing of the machine by the straw, and effectually to shake the grain out of it, we employ a cylindrical rake I, furnished with teeth, standing out nearly in the direction of a tangent to its periphery. Said rake may be driven by a band $K^1$, Fig. 3. When the straw arrives at the end of the machine, it is thrown off by a revolving roller L, driven by a suitable band, and set with teeth.

M, is a curb of wood, or iron, to conduct the grain from the apron to the feeding apparatus, which is arranged, generally, in the usual way, N, N, being sieves, or screens, O, the fan, or vane wheel, P a pulley, driven by a band or gearing to work the shaker rod of the sieves, Q, a covering over the fan, R a box to receive the cleaned grain. We sometimes place a bag S, with a frame at its mouth, to receive the light wheat, or tailings.

T, Fig. 3, are long wires projecting out above the sieves, to retain any straw which may accidentally fall down.

It is sometimes important to regulate the quantity of wind to effect the winnowing, and this has heretofore been done by a shutter within the machine; but we effect this by means of a shutter or shutters U, over the supply hole of the wind wheel, by which it can be closed in any required degree.

To insure the perfect cleaning of the grain we place a sieve $N^2$ beyond the sieve N, into which the light grain that may have passed N, may be received, passing through into a shoe underneath and out at a spout upon an elevator which carries this light grain up into the sieves again for a more effectual cleaning.

The elevator is not shown in the perspective drawing, Fig. 2; but separately in Fig. 4, in which *d,* is a spout through which the light grain may run, and be delivered on to a band of elevators *e,* by which it is conducted up to the spout *f,* from which it again falls upon the sieve N.

We claim as our invention—

1. The construction and use of an endless apron, divided into troughs, or cells in a machine for cleaning grain, operating substantially in the way described.

2. We claim also, the revolving rake for shaking out the straw, and the roller for throwing it off the machine, in combination with such a revolving apron, as set forth.

3. We claim the guard slats E in combination with a belt constructed substantially as above described; and the combination of the additional sieve and shoe, and with the elevator for carrying up the light grain in the manner, and for the purpose herein set forth.

In testimony that the above is a true specification of our said improvement we have hereunto set our hands this twenty sixth day of May 1837.

JOHN A. PITTS.
HIRAM A. PITTS.

Witnesses:
  SAML. P. BENSON,
  CALEB HARRIS.